April 30, 1957     W. A. BARNES     2,790,628
FABRICATED FIN TUBE HEAT EXCHANGER
Filed April 29, 1953
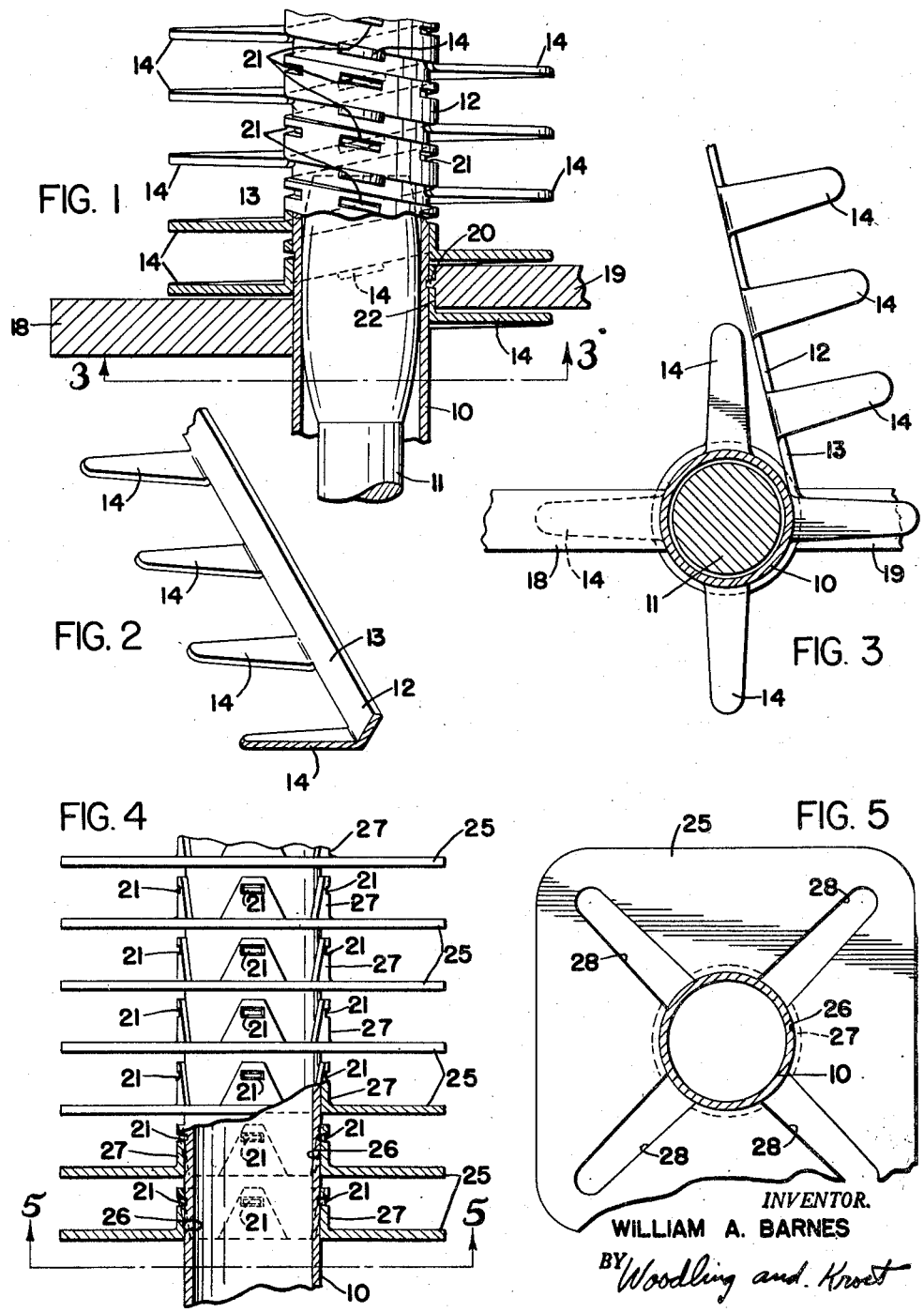
INVENTOR.
WILLIAM A. BARNES
BY Woodling and Kroet
ATTYS.

United States Patent Office 2,790,628
Patented Apr. 30, 1957

2,790,628

FABRICATED FIN TUBE HEAT EXCHANGER

William A. Barnes, Utica, N. Y., assignor to Utica Drop Forge & Tool Corporation Application April 29, 1953, Serial No. 351,908

11 Claims. (Cl. 257—262.2)

This invention relates to heat exchanger units in general, and relates more specifically to a heat exchange unit having a fabricated construction of tubular member and fins.

Fin type heat exchanger members have long been used because of the efficient transfer of heat between a fluid within the tubing and the fluid exterior of the tubing. This type of heat exchanger has been made as a cast integral structure of tube and fin, and has been made of fabricated members. The fabricated type of construction is by far the most common. However, fabrication of fin type heat exchanger units has been largely confined to steel because of the difficulty of fabricating other materials, or of using two different materials in the fabricated structure.

Steel tubing and steel fins may be readily produced by spot welding of the fins to the tube. However, there are many instances where steel tubing is not acceptable. Furthermore, steel does not give the same fast heat transfer that can be obtained from copper and aluminum. Copper tubing and copper fins can be fabricated by soldering and certain types of carefully controlled welding. Furthermore, aluminum fins have long been desired, and can conceivably be secured to the surface of a copper tube by welding and, with difficulty, by soldering.

Soldering, brazing, and welding, furthermore, do not produce the most efficient heat transfer connection between tube and fin. As a general rule, all commercial alloys suitable for soldering and brazing have a low heat conductivity factor in comparison with pure copper and aluminum. Welding, even electric spot welding, produces poor mechanical contact between flat surfaces, and is a relatively poor heat transfer medium.

In all of the foregoing types of prior art fin tube heat exchangers, the production is difficult and expensive, or the material is not satisfactory for the purpose. There are many metals where the relatively high temperatures regarded as essential for welding have deleterious effects on the metal. This is particularly so in the case of such metals as aluminum, and also in the case of copper which is softened and annealed in the region of the welding. This occurs to such an extent that complex mechanisms are utilized in an attempt to overcome the softening effect which destroys the mechanical strength of the metal.

Moreover, the welding mechanisms employed are complex and costly since the high temperatures employed make it essential to maintain the operating temperatures within close critical ranges. An application of heat for a slightly increased period of time over that actually necessary further deteriorates the metal, while on the other hand the use of a temperature slightly below that required results in an imperfect weld which fails to properly hold. Because of this marginal character of high temperature welding, not only is it necessary to employ complex and costly welding machines, but specially skilled operators who have special training in controlling and operating the welding equipment.

In the face of these extreme difficulties with high temperature welding and with the joining of non-ferrous metals to ferrous metals, or to different types of non-ferrous metals, it has heretofore been regarded as unsatisfactory to construct a fabricated heat exchange fin tube of non-ferrous metals, although in extensive use because of a lack of anything better.

According to this invention, it has been discovered that by the proper control of the metals to be joined, good fabricated structures can be accomplished without the use of any attachment means other than the metal being joined, and without the use of any temperature creating apparatus. The structure is cold welded. When the term "cold welded" or "cold weld" is used, a solid phase bond is meant regardless of the technicalities of its production.

An object of this invention is to provide a fin tube heat exchanger having a fabricated construction without the use of auxiliary fastening means;

Another object of this invention is to provide a fin tube heat exchanger having a copper tube and aluminum fins.

Another object of this invention is to construct a fabricated copper-aluminum fin tube heat exchanger without auxiliary fastening means;

And another object of this invention is to provide a fabricated fin tube heat exchange unit having superior heat transmission between tube and fin over welded, soldered, or brazed construction.

Other objects and a fuller understanding of the invention may be had by referring to the following description and claims, taken in conjunction with the accompanying drawings, in which:

Figure 1 is a top plan view of a fin tube heat transfer device, partly in section with an internal mandril supporting the tubular walls, and with the cold weld die and support member illustrated diagrammatically in the position achieved during the uniting of the fins to the tubes;

Figure 2 is a perspective view of one type of fin construction adapted for spiralling around and along a fluid conduit;

Figure 3 is a sectional view taken along line 3—3 of Figure 1, with the fin construction of Figure 2 illustrated in the background representing the step of wrapping the fin members around the basic tubular member;

Figure 4 is a plan view of an alternate construction embodying separately stamped individual fin members secured along the length of the tubular member; and Figure 5 is a sectional view taken along the line 5—5 of Figure 4 and illustrating the outlined form of the preferred embodiment of the alternate structure.

In Figures 1, 2, and 3 of the drawings, there is illustrated a spiral type of fabricated fin tube construction. A tubular member 10, preferably of copper for corrosion resistance and good heat transfer quality, forms the basic fluid carrying member of the heat exchanger. In the construction of the first three figures of the drawing, a fin strip 12 is provided and is secured to the outside surface of the tube 10. Fin strip 12 is preferably made by a series of stamping operations and a bending operation, to provide a continuous base portion 13 with a plurality of fins 14 extending therefrom at substantially right angles to the plane of the base portion 13.

A mandril 11 is inserted into the tube 10 to provide resistance to collapse of the tube from outside forces during fabrication of the construction.

In the fabrication of the improved fin tube construction of Figures 1–3, the fin strip 12 is spiraled around the outside surface of the tube 10 and the base portion 13 thereof is secured to the surface of tube 10 at intervals sufficient to hold the base portion 13 in tight metallic contact for good heat transfer, and to maintain the fins in proper position against dislocation by mechanical contact. There are many possible means for spiraling the fin strip 12 upon the tube 10 in commercial production, one of which would be a guiding mechanism passing the tube and the strip 12 under a punch press as the spiralling proceeds. Reference character 18 indicates a diagrammatic representation of a support for the tube cam and mandril 11, and the reference character 19 represents a die of proper design and construction to indent the metal of the base portion 13 and cause a cold flow of the metal in such a manner that a cold weld is produced between the base member 13 and the tube 10.

However, there are certain preparatory steps and considerations which must be observed before a good union can be produced by cold welding of the base 13 to the tube 10 without the use of auxiliary fastening means. A film of oxide begins to form on aluminum immediately after the actual metal surface of the aluminum is exposed to the atmosphere. Several days may elapse before the film reaches its final thickness. Once formed, however, although thin by ordinary standards, this film is sufficient to reduce the weldability of the material. In cold pressure welding, the metal is caused to flow away from the welding point or contact area as the dies or tools are brought together. The effect of the flow of the interface is to disperse the protective or oxide film in the material and so bring about the necessary metallic contact required for welding. More flow will be required to disperse the oxide film and produce this contact if the film has reached its final thickness than if it is almost or completely non-existent. In order to obtain the best weld with a minimum of reduction in metal thickness at the weld, the surfaces to be welded should be free from any contaminating oxide film or other impurities such as foreign matter, oil, and grease adhering to the surfaces to be cold welded. In fact, the oil from the clean human skin is sufficient to form a foreign film over the surfaces of sufficient thickness to prevent proper adherence in the weld.

Accordingly, the metal must have a clean surface from which the oxide or other film or foreign matter has been removed prior to the cold welding operation. Once the surfaces have been cleaned, welding should be accomplished before the time required for the oxide film to reform to any appreciable extent. That is, the cleaning operation should closely precede the actual fabrication of the heat exchange unit. Usual cleaning methods such as filing or treatment with abrasive have been found to leave impurities ground back into and re-imbedded in the surface, as well as leaving particles of abrasives in the metal. Although the technique for cleaning various surfaces will differ with the particular metal being welded, in the case of aluminum and copper, a scratch brush consisting of steel wire rotating at a high surface speed has proven to be a satisfactory method of cleaning. The size of the wire in the brush and the speed at which it is rotated can readily be determined by observation according to the thickness of the film to be removed. Aluminum cleans quite readily, but in copper, the oxide is very resistant to scratch brushing. The end result of the brushing should be a surface having a pebbly grain appearance.

The metals to be welded are subjected to variable pressure depending on the particular metals, but the applied pressure should always be just above the flow point of the metal. In the case of aluminum, this pressure is moderately high and only slightly above the flow point for aluminum. In the case of copper, the pressure required is from two to four times less that required for aluminum.

Although the exact pressure to be applied will depend somewhat upon whether or not the metal around the area being welded is unrestricted with respect to the flow of metal sideways from the weld point, in the construction of the present invention, there is substantially no restriction and, accordingly, pressures in the lower range can be employed. The correct perimeter of the weld also helps keep the required pressure low. Thus, if the area of the pressed area is small compared to the perimeter as in the case of the long and narrow rectangular weld area, a greater freedom of lateral flow of metal is available with resultant improved weld results.

Accordingly, as illustrated best in Figure 1 of the drawings, the die 19 is provided with a pressure tip 20 of such size and shape as to produce a long and narrow indentation 21. Furthermore, a lateral section of the die 19 is large with respect to the pressure tip 20 in order to provide a shoulder 22. The shoulder 22 acts as an automatic gauge to prevent excessive penetration of the pressure tip 20 and also to smooth out any tendency of the metal to bulge around the indentation 21.

It has been found that the rate of application of the pressure does not appear to affect the strength of the weld. Good welds have been secured both with slow squeeze and with impact. However, it has been found that the shape and degree of indentation provided by the die 19 is a definite factor in good welding. In the present invention, where it is necessary to avoid a depression or indentation within the tube 10, the mandril 11 is formed with a smooth outer surface and the width of the pressure tip 20 is approximately one and one-half times the combined thickness of the base portion 13 and the wall thickness of the tube 10. It is entirely conceivable that the surface of the mandril may be provided with a pressure tip similar to tip 20, in which event the width of both of the pressure tips may be reduced to a width about equal to the thickness of the two walls.

Further, it is possible, although less desirable, to put a pressure tip only on the mandril and therefore indent on the internal surface only. It is possible to eliminate the base flange 13 in this manner.

Although great mechanical strength is not a prime consideration in the construction of a fabricated heat exchange unit, unusually good heat transfer qualities have been found to be the result of uniting the thin strip to the tube in this manner. Good heat transfer requires intimate contact between fin and tube in a fabricated construction. The cold welding operation produces the best possible heat transfer union between these separate pieces. The heat transfer function is considerably better than even the best weld or soldering operation. This unusual result produces a remarkably superior fabricated construction heat transfer device. Nevertheless, it has been found that although the metal thickness has been substantially reduced over the welding area, the metal has in some cases been work hardened to twice its original strength, and therefore the welded section will in these cases be considerably stronger than expected. By use of a multiple number of welded areas, the strength of the construction will be more than sufficient, and the heat transfer through the actual weld areas and through the contacting surfaces is far better than would be expected. In fact, the superior heat transfer alone makes the present invention superior to other methods.

As previously indicated, many advantages are obtained by making the tube 10 of copper and the fin construction 12 of aluminum. Where two different metals, such as aluminum and copper, are to be welded, the area of the pressure tip 20 coming in contact with the softer metal is made larger than if it were coming in contact with the harder metal. This controls the final weld thickness by the two metals. In other words, the mandril 11 is designed to give full support to the soft copper tube 10, and the size and shape of the pressure tip 20 in relationship to the shoulder 22 are designed to produce a thorough indentation of the aluminum into the copper.

Figures 4 and 5 of the drawings illustrate an embodiment of the invention comprising a plurality of stamped sections 25 having a central opening 26 therethrough and having flanges 27 formed around the opening 26 to contact the surface of the tube 10 and provide a base to be cold welded to the surface of the tube 10. Although a solid plate is entirely satisfactory, it has been found that by the provision of a plurality of radiating slots 28, better air circulation and therefore better heat transfer is achieved. The welding and spacing of the individual stamped sections is carried out with the consideration discussed with regard to the modification shown in Figure 1 of the drawing.

In conclusion, therefore, it has been found that although the fabricated construction illustrated in the drawing could be produced by welding and soldering, or by mechanical fastening means, the use of cold pressure welding produces a metal relationship between the individual members of the fabricated construction which very closely approaches the excellent heat transfer to be expected from a one piece construction, with the additional advantage of providing the use of one type of metal for the tubular member and a dissimilar type of metal for the fin construction. Accordingly, it is believed that the present invention has provided a unique structure which cannot be equaled by any construction known and used prior to this invention.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fin tube construction, comprising, a tubular fluid conduit, a plurality of radially extending fins projecting from the surface of said conduit, said fins having a fin portion and a base portion, said base portion extending laterally of said fin portion and having an interface contacting closely against said conduit, and a section of said base portion having an area pressed into the material of said conduit to an extent causing the material to flow away from said area at the interface to disperse protective oxide films and create a cold pressure welded joint between said section and said conduit.

2. A fin tube construction, comprising, a copper tubular fluid conduit, a plurality of radially extending aluminum fins projecting from the surface of said conduit, said fins having a fin portion and a base portion, said base portion extending laterally of said fin portion and against said conduit, and a section of said base portion being embedded into the metal of said conduit to an extent to create a cold pressure welded joint between said section and said conduit in the absence of heat from an external source.

3. A fin tube construction, comprising, a tubular fluid conduit, fin means presenting a plurality of radially extending fins projecting from the surface of said conduit, said fin means comprising a base strip having a plurality of spaced fin members projecting therefrom, said base strip wrapped in a spiraling manner around and along said conduit, said fin members extending outwardly from said conduit, said base strip having an interface contacting closely against said conduit, and a plurality of sections along said base strip being indented into the material of said conduit in long narrow areas to an extent to create cold pressure welded joints between said areas and said conduit and said interface of said base strip around said narrow cold welded areas being held in close heat conducting contact with said conduit.

4. A fin tube construction, comprising, a copper tubular fluid conduit aluminum fin means presenting a plurality of radially extending fins projecting from the surface of said conduit, said fin means comprising a base strip having a plurality of spaced fin members projecting therefrom, said base strip wrapped in a spiraling manner around and along said conduit, said fin members extending outwardly from said conduit, and a plurality of spaced narrow sections along said base strip being cold pressure welded to said conduit, said sections being of a width approximately one and one-half times the combined wall thickness of said base strip and conduit.

5. A fin tube construction, comprising, a tubular fluid conduit, fin means presenting a plurality of radially extending fins projecting from the surface of said conduit, said fin means comprising a base strip having a plurality of spaced fin members projecting therefrom, said base strip wrapped around said conduit, said fin members extending outwardly from said conduit, and a plurality of sections along said base strip being indented into the material of said conduit to an extent to create cold pressure welded joints between said sections and said conduit.

6. A fin tube construction, comprising, a tubular fluid conduit, fin means presenting a plurality of radially extending fins projecting from the surface of said conduit, said fin means comprising a plurality of separate fin members, each said fin member comprising a sheet of material having an opening centrally therethrough, a portion of said sheet turned over as flange means around said opening, said flange means contacting the surface of said conduit, and a plurality of sections of said flange means cold pressure welded to said conduit.

7. A fin tube construction, comprising, a tubular fluid conduit, fin means presenting a plurality of radially extending fins projecting from the surface of said conduit, said fin means comprising a plurality of separate fin members, each said fin member comprising a sheet of material having an opening centrally therethrough with a plurality of slots radiating from said opening, said sheet turned over as flanges between said slots around said opening, said flange means contacting the surface of said conduit, and a section of each said flange cold pressure welded to said conduit.

8. A heat exchanger fin tube construction, comprising a copper tubular fluid conduit, a plurality of aluminum radially extending fins projecting from the surface of said conduit, said fins having a fin portion and an arcuate base portion, said base portion extending laterally of said fin portion and against said conduit, and sections of said base portion between said fin and free edge of said base portion and at circumferentially spaced intervals being embedded into the metal of said conduit walls with narrow weld areas elongated in a circumferential direction and being cold-pressure welded in said areas to said conduit.

9. A finned heat transfer construction, comprising, a heat transfer wall, said wall having a first heat receiving surface and a second heat loss surface, a finned member having a base portion, the base portion positioned on said heat loss surface, at least one weld spot area uniting the base portion to said surface, said weld spot area being a weld produced by external expansion of the material of the base portion and said wall from said spot under high pressure and confined flow while in mutual contact resulting in an intimate mutually cohesive bonded relationship in said spot characterized by an absence of any intermediate agent, the material of said finned member base portion in said welded spot being positioned closer to said first heat receiving surface of the heat transfer wall than the balance of the base portion.

10. A finned heat transfer construction according to claim 9, wherein the material of the fin base portion being at least partially depressed below the contour generated by the said heat loss surface.

11. A finned heat transfer construction according to claim 9, wherein the fin base portion being a wall with a first surface mated to said second surface of the heat transfer wall and a second surface, said second surface in said weld spot being embedded into the said heat transfer wall to the extent that the second wall surface of the base portion extends below the contour generated by the said heat loss surface.

References Cited in the file of this patent

UNITED STATES PATENTS

| | | |
|---|---|---|
| 649,204 | Grouvelle et al. | May 8, 1900 |
| 1,758,638 | Young | May 13, 1930 |
| 1,788,516 | Gannon | Jan. 13, 1931 |
| 2,251,074 | Sibley | July 29, 1941 |
| 2,270,810 | Larriva | Jan. 20, 1942 |
| 2,400,737 | Brown | May 21, 1946 |
| 2,522,408 | Sowter | Sept. 12, 1950 |
| 2,608,887 | Sowter | Sept. 2, 1952 |